F. W. WARDWELL, Jr.
SAW SETTING DEVICE.
APPLICATION FILED APR. 20, 1914.

1,168,352.

Patented Jan. 18, 1916.
2 SHEETS—SHEET 1.

Attest
J. C. Harrold.
B. C. Taylor

Inventor
Frank W. Wardwell Jr.
by
Fisher & Moser attys

THE COLUMBIA PLANOGRAPH CO., WASHINGTON, D. C.

F. W. WARDWELL, Jr.
SAW SETTING DEVICE.
APPLICATION FILED APR. 20, 1914.
1,168,352.
Patented Jan. 18, 1916.
2 SHEETS—SHEET 2.
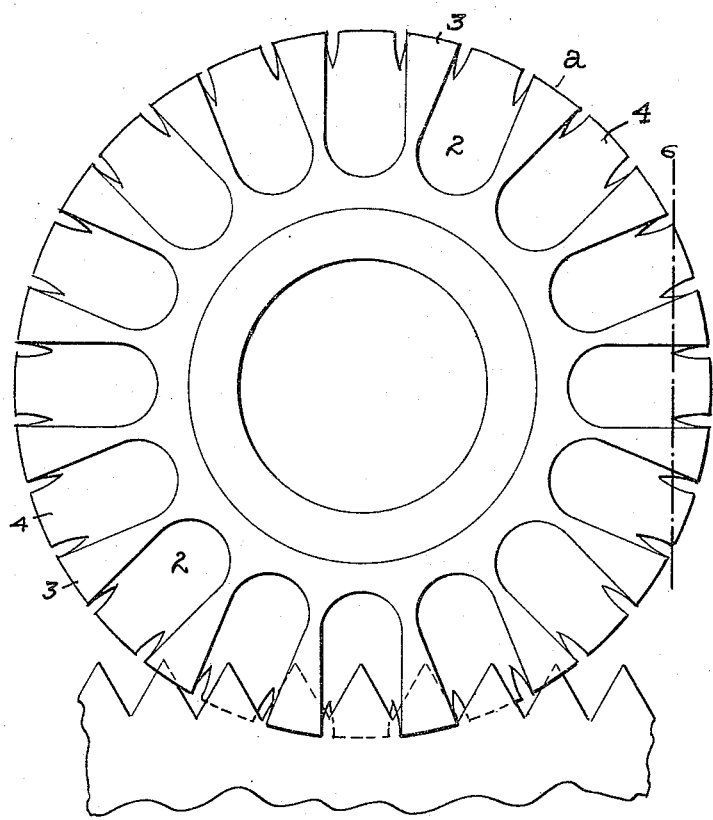
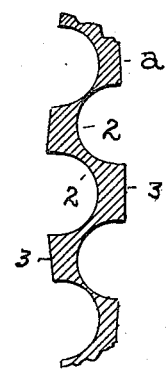
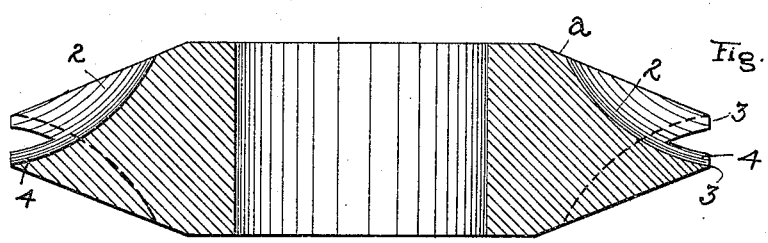

UNITED STATES PATENT OFFICE.

FRANK WELLINGTON WARDWELL, JR., OF CLEVELAND, OHIO.

SAW-SETTING DEVICE.

1,168,352.  Specification of Letters Patent.  Patented Jan. 18, 1916.

Application filed April 20, 1914. Serial No. 833,300.

*To all whom it may concern:*

Be it known that I, FRANK WELLINGTON WARDWELL, Jr., a citizen of the United States, residing at Cleveland, in the county of Cuyahoga and State of Ohio, have invented certain new and useful Improvements in Saw-Setting Devices, of which the following is a specification.

This invention consists in an improvement in saw setting devices, all substantially as shown and described and particularly pointed out in the claims.

Figure 1:
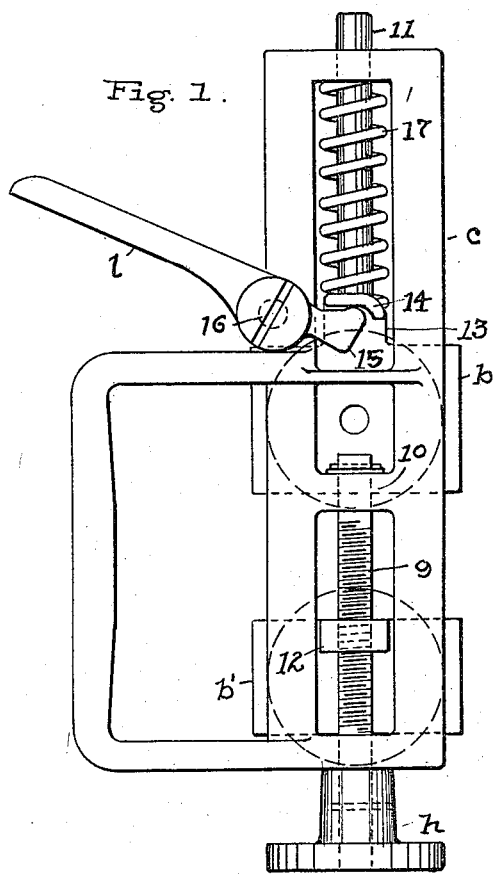
Figure 2:
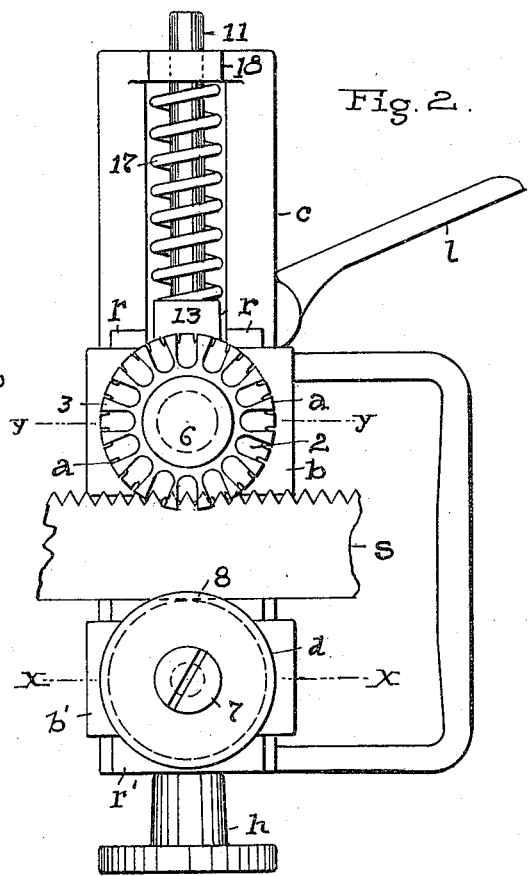
Figure 3:
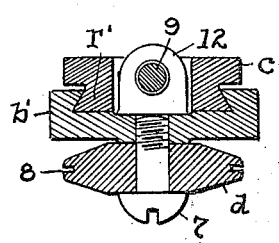
Figure 4:
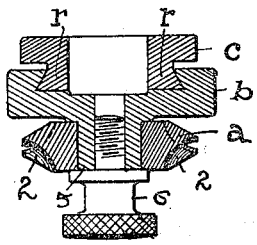

In the accompanying drawings, Figure 1 is an elevation of the device showing the side with the handle and adjusting lever, and Fig. 2 is a plain elevation of the opposite side of the device showing the setting wheel and a saw engaged thereby in setting relations. Fig. 3 is a cross section on a line corresponding substantially to $x-x$, Fig. 2, and Fig. 4 is a cross section on line $y-y$, Fig. 2. Fig. 5, Sheet 2, is an enlarged side elevation of the setting wheel and a section of a saw in setting relations therewith. Fig. 6 is a cross section on line 6—6, Fig. 5, showing especially the transverse curvature of the setting cavities in the wheel. Fig. 7 is a central cross section of the wheel.

This invention is an improvement upon a saw-setting device covered by Letters Patent of the United States, No. 944,729. The said patent discloses a rotatable tooth setting member, a grooved roller opposite the same to carry the saw and a yielding pressure mechanism to accommodate differences in the widths of the saw blades passed through the device, and to vary the amount of set.

The present invention contains parts which fall more or less within these broadly stated terms but the construction is materially different from the original device in nearly all essential particulars. For example, I employ a rotatable setting member, $a$, referred to herein also as a setting wheel, which is slidably mounted upon a suitable frame $c$ by means of a bracket $b$. As a member capable of setting saw teeth, the said wheel is not in itself new, a wheel having this function being shown in the said Letters Patent, but this material difference exists in the present wheel over the original one that it has alternately opposite cavities 2 about its periphery which are of compound concave curvature, whereas in the patent referred to the said cavities were concave radially but flat transversely. This shape or form of the setting cavity was found defective for the reason that all the teeth would not come alike to the center of the cavity but some would rest or come at the side thereof and hence get less set than those that came to the said center, the sides of said cavities radially being different from their middle portion. Hence I have improved the construction of the wheel by making all the cavities with a compound curvature which is on a given arc radially and a shorter arc transversely of the cavity, as seen respectively in Figs. 6 and 7. By this construction of the said cavities the teeth are successively drawn or forced from the sides of the cavity to the exact center thereof and it must follow that all will be set exactly alike, it being understood, of course, that the action of the device is absolutely uniform in all other particulars as to all the teeth passed through the same. The said cavities alternate on opposite sides of wheel $a$ and are spaced apart equal to the space between the teeth of the saw $s$. Of course saws differ much in the style and sizes of teeth, and the present invention contemplates interchangeability of wheels according to the number of teeth to the inch in different saws. The space between cavities is marked by ribs 3 on each side which also form a portion of the side walls of the cavities, and these ribs are widest at the periphery of the wheel and have flat inner landing surfaces for the cavities of the opposite series. Thus, from another point of view there are right and left series of cavities and the cavities of each series have the walls or ribs 3 between the same and projecting out into the periphery of the wheel have the table or landing portion of the opposite cavity at the extremity thereof, as seen at 4. Hence, looking directly upon the edge of the wheel we see the extremities of the said ribs staggered and having a V-shaped space between them. The toothed edge of the saw blade in a sense comes into this space as the teeth impinge upon the landings of said ribs and are set as they are forced inward upon the curved walls of the said cavities. Just how this occurs is seen in Fig. 5.

Now, referring again to the mounting or bracket $b$ it will be seen that it has a dovetailed and slidable support on the short ribs $r$ upon frame $c$, Figs. 2 and 4, while the saw supporting roller $d$ has a similar dovetail mounting or bracket $b'$ on ribs $r'$, relatively beneath the parts carrying wheel $a$, as seen in Figs. 2 and 3. The bracket $b$ has a tubular projection or bearing 5 carrying the wheel $a$ and which is held operatively in place by a thumb screw 6 in said bearing, while an ordinary screw 7 serves as a support for the roller $d$ on the bracket $b'$. The said roller $d$ has an annular channel 8 in its periphery in which to engage the back of the saw while the teeth thereof come into the cavities 2, as seen in Fig. 2. This affords all the support the saw requires and adjustment is effected between the said roller and wheel by means of a screw spindle 9 having a fixed bearing at its inner end in the cross portion 10 of the said frame and an internally threaded lug 12 on the inside of roller bracket $b'$ engaged upon the spindle 9. A suitable head $h$ on said screw enables the same to be turned to adjust the roller bracket $b'$ and to change the distance between the roller $d$ and wheel 2 with all necessary exactness according to the saw to be set. A lever $l$ is adapted to lift the said wheel $a$ through its bracket $b$, temporarily, for any shift made in the saws or for any other purpose. The bracket $b$ has an extension 13 with a curved lip 14 projecting outward beyond frame $c$ and engaged by a cam 15 on the short end of said lever inside its pivot 16 on said frame. A spiral spring 17, is mounted loosely about a stem or rod 11 and bears upon said bracket extension 13 at its bottom and against a lug 18 on the end of frame $c$, the stem 11 projecting through said lug. In operation the spring 17 maintains a constant down pressure upon the wheel bracket $b$ to hold the wheel 2 in engagement with the saw, and the bracket and wheel are raised by the lever $l$ when the saw is introduced or removed.

What I claim is:

1. As a new article of manufacture, a rotatable wheel for setting saws having compound concave cavities in its periphery to engage the teeth of the saw and landings between said cavities, the said wheel being beveled on both sides toward its periphery and the said cavities of substantially the same width to the bottom thereof.

2. As a new article of manufacture, a saw setting wheel having cavities in its periphery alternately on opposite sides and concave radially and transversely and of substantially the same width to the bottom thereof, the transverse concavity being less than the radial.

3. As a new article of manufacture a wheel adapted to set saws having oppositely disposed cavities in its periphery and the said cavities curved axially to an arc and transversely to a shorter arc, and ribs between said cavities tapering inward from the periphery of the wheel and extending the full depth of said cavities.

4. As a new article of manufacture a wheel to set saws having opposite compound concave cavities alternately and radially disposed ribs between the cavities of each side provided with landings for the cavities on the opposite side, the said ribs increasing in width from the bottoms of the cavities to the said landings.

In testimony whereof I affix my signature in presence of two witnesses.

FRANK WELLINGTON WARDWELL, Jr.

Witnesses:
R. B. MOSER,
B. C. TAYLOR.

Copies of this patent may be obtained for five cents each, by addressing the "Commissioner of Patents, Washington, D. C."